US010281922B2

(12) United States Patent
Smith et al.

(10) Patent No.: US 10,281,922 B2
(45) Date of Patent: May 7, 2019

(54) METHOD AND SYSTEM FOR MOBILE WORK SYSTEM CONFINEMENT AND LOCALIZATION

(71) Applicant: MTD Products Inc, Valley City, OH (US)

(72) Inventors: Steven W. Smith, Stow, OH (US); Micah E. Wolf, Brunswick, OH (US); Maynard S. Guadiz, Strongsville, OH (US)

(73) Assignee: MTD PRODUCTS INC, Valley City ( * ) Notice: Subject to any disclaimer, the term of this patent is extended or adjusted under 35 U.S.C. 154(b) by 0 days.

(21) Appl. No.: 15/791,780

(22) Filed: Oct. 24, 2017

(65) Prior Publication Data
US 2018/0059676 A1    Mar. 1, 2018

Related U.S. Application Data

(62) Division of application No. 14/776,138, filed as application No. PCT/US2014/030863 on Mar. 17, 2014, now Pat. No. 9,829,891.
(Continued)

(51) Int. Cl.
*G01D 1/02* (2006.01)
*G01B 11/14* (2006.01)
*G05D 1/02* (2006.01)

(52) U.S. Cl.
CPC ............ *G05D 1/0231* (2013.01); *G01B 11/14* (2013.01); *G05D 1/0244* (2013.01); *G05D 1/0259* (2013.01)

(58) Field of Classification Search
CPC .. G05D 1/0244; G05D 1/0231; G05D 1/0259; G01B 11/14
See application file for complete search history.

(56) References Cited

U.S. PATENT DOCUMENTS 6,764,373 B1    7/2004  Osawa et al.
8,306,479 B1 *  11/2012 Lorang ............... H04W 72/044
                                                    455/67.11
(Continued)

FOREIGN PATENT DOCUMENTS

JP    2001-125641 A    5/2001
JP    2002-116023 A    4/2002

OTHER PUBLICATIONS

International Search Report and Written Opinion dated Jul. 9, 2014 for corresponding patent application No. PCT/US2014/030863.
(Continued)

*Primary Examiner* — Michael A Lyons
*Assistant Examiner* — Violeta A Prieto
(74) *Attorney, Agent, or Firm* — Wegman, Hessler & Vanderburg

(57) ABSTRACT

The disclosed technology relates to a method and system for localizing and confining an autonomous mobile work system or systems for performing work in a user defined space. The system can include two or more variable reflective base stations at first and second locations that can modify their optical or electromagnetic reflectivity based upon either an external command via wired or wireless communications interface, or automatically on a regular or asynchronous time schedule under programmed or user settable control. The system also can include one or more autonomous mobile work systems capable of sensing the state of the variable reflectance base stations via sensors such as electromagnetic or optical sensors capable of measuring distance to the reflective base stations.

13 Claims, 10 Drawing Sheets

Related U.S. Application Data

(60) Provisional application No. 61/801,724, filed on Mar. 15, 2013.

(56) References Cited

U.S. PATENT DOCUMENTS

| | | | |
|---|---|---|---|
| 8,823,952 B2 * | 9/2014 | Masa | G01B 11/14 356/614 |
| 9,857,162 B1 * | 1/2018 | Gum | G01B 11/002 |
| 2008/0267450 A1 | 10/2008 | Sugimoto et al. | |
| 2009/0029715 A1 * | 1/2009 | Burchardt | H04W 64/00 455/456.1 |
| 2010/0135178 A1 * | 6/2010 | Aggarwal | G01S 5/0205 370/252 |
| 2011/0287778 A1 * | 11/2011 | Levin | G01S 5/0252 455/456.1 |
| 2011/0287801 A1 * | 11/2011 | Levin | H04B 17/391 455/517 |
| 2012/0154824 A1 * | 6/2012 | Kim | G01S 5/16 356/623 |
| 2013/0182242 A1 * | 7/2013 | Masa | G01B 11/14 356/72 |
| 2014/0240317 A1 * | 8/2014 | Go | G01B 11/026 345/426 |
| 2015/0195789 A1 * | 7/2015 | Yoon | G06F 3/0488 345/173 |

OTHER PUBLICATIONS

Notice of Rejection, and translation thereof, issued in corresponding Japanese Patent Application No. 2016-502575 dated Mar. 6, 2018.

* cited by examiner

Moving base station/second mower

Fixed survey marker
RFID, optical, magnetic etc.

Moving base station/third mower mower

Green LCD state is depicted on the left and Black LCD state is depicted on the right.

Simple single pixel display which can be a simple square or a fixed pattern.

Also graphic, segmented or variable displays could be used.

METHOD AND SYSTEM FOR MOBILE WORK SYSTEM CONFINEMENT AND LOCALIZATION

CROSS-REFERENCE TO RELATED APPLICATIONS

This application is a divisional application of U.S. patent application Ser. No. 14/776,138 filed Sep. 14, 2015, which claims the priority filing benefit of International PCT Application PCT/US2014/030863 filed Mar. 17, 2014, and published under PCT 21(2) in the English language, and U.S. Provisional Patent Application Ser. No. 61/801,724 filed Mar. 15, 2013. Each of the above listed applications is incorporated herein by reference.

FIELD OF THE INVENTION

The disclosed technology relates generally to localization and control of an autonomous mobile work system, and, more particularly, to a low cost localization method and system for controlling position of an autonomous mobile work system relative to reflective base stations.

BACKGROUND OF THE INVENTION

In the past, many methods and systems for the localization of an autonomous mobile work system have been proposed and implemented. These include systems relying upon technologies such as dead reckoning, odometers, inertial navigation systems, satellite based positioning systems, active beacons, RFID, magnetic compasses and various terrestrial radio location systems. However, these systems have proven over time to be too unreliable, expensive or complex for use in consumer products.

BRIEF SUMMARY OF THE INVENTION

Aspects of the disclosed technology relate to a system and method for localizing and confining an autonomous mobile work device or devices to a user-defined space. The system includes at least one autonomous mobile work device that is configured to interact with one or more variable reflective base stations. Through interaction with the variable reflective base stations, the disclosed system provides a cost-effective way to localize an autonomous mobile work device by determining distance to external variable reflectors.

One aspect of the disclosed technology relates to an autonomous mobile work system for performing work in a designated area, the system comprising: at least one variable reflectivity base station, the base station being configured to change its optical and/or electromagnetic reflectivity in response to an external command and/or according to a predetermined time schedule; and a mobile work device including at least one sensor configured to locate the at least one variable reflectivity base station, wherein the mobile work device is configured to determine a distance between the mobile work device and the at least one variable reflectivity base station.

According to one feature, the mobile work device includes a variable reflectivity indicator, the mobile work device being configured to change its optical and/or electromagnetic reflectivity.

According to one feature, the at least one base station includes a sensor configured to detect the variable reflectivity indicator of the mobile work device.

According to one feature, the mobile work device includes a wireless communication interface, and wherein the mobile work device is configured to transmit a command to the at least one variable reflectivity base station to change its optical and/or electromagnetic reflectivity.

According to one feature, the at least one variable reflectivity base station includes a wireless communication interface, and wherein the at least one variable reflectivity base station is configured to receive wireless signals from the mobile work device.

Another aspect of the disclosed technology relates to a mobile work device configured to perform work within a predetermined area, the mobile work device comprising: at least one sensor configured to locate a variable reflectivity base station located in proximity to the predetermined area, wherein the mobile work device is configured to determine a distance between the mobile work device and the at least one variable reflectivity base station.

According to one feature, the mobile work device includes a variable reflectivity indicator, the mobile work device being configured to change its optical and/or electromagnetic reflectivity.

According to one feature, the mobile work device includes a wireless communication interface, and wherein the mobile work device is configured to transmit a command to the at least one variable reflectivity base station to change its optical and/or electromagnetic reflectivity.

Another aspect of the disclosed technology relates to a base station configured to communication with a mobile work device within a predetermined work area, the base station comprising: a variable reflectivity base indicator, the base station being configured to change its optical and/or electromagnetic reflectivity in response to an external command and/or according to a predetermined time schedule.

According to one feature, the base station includes a sensor configured to detect a variable reflectivity indicator associate with the mobile work device.

According to one feature, the base station includes a wireless communication interface, and wherein the at least one variable reflectivity base station is configured to receive wireless signals from the mobile work device.

Another aspect of the disclosed technology relates to an autonomous mobile work system for performing work in a user selected area, the system comprising: a mobile work device including a sensor configured to locate a variable reflectivity base station and measure the distance to said base station; and at least one variable reflectivity base station.

According to one feature, the system includes at least one charging base station.

According to one feature, the system includes a plurality of base stations, wherein at least one of the plurality of base stations is a charging base station.

Another aspect of the disclose technology relates to a unified work apparatus comprising: an autonomous mobile work device comprised of a sensor configured to locate a variable reflectivity base station and measure the distance to said base station; and at least one variable reflectivity base station.

According to one feature, the apparatus includes at least one charging base station.

Another aspect of the disclosed technology relates to a method of determining the location of an autonomous mobile work device, the method comprising: providing a first and second variable reflectivity base station and an autonomous mobile work device, wherein said autonomous mobile work device is configured to determine a distance between said base station and said autonomous mobile work system; providing the location and orientation of a first variable reflective base station to said autonomous mobile work device; providing the location and orientation of a second variable reflective base station to said autonomous mobile work device; changing the reflectivity state of said first base station; calculating the distance between said first base station and said autonomous mobile work system; changing the reflectivity state of said second base station; calculating the distance between said second base station and said autonomous mobile work system; and calculating the location of said autonomous mobile work system using said calculated distances between said autonomous mobile work system and said first and second base stations.

Another aspect of the disclosed technology relates to a method of determining the location of an autonomous mobile work system comprising: providing a first and second variable reflectivity base station and an autonomous mobile work device, wherein said autonomous mobile work system is configured to calculate the distance between said base station and said autonomous mobile work system; obtaining the distance between said autonomous mobile work system and each of said first and second base stations; and calculating the location of said autonomous mobile work system using said calculated distances between said autonomous mobile work system and said first and second base stations.

Another aspect of the disclosed technology relates to a method of determining the location of an autonomous mobile work system comprising: calculating the location of said autonomous mobile work system using a calculated distance between said autonomous mobile work system and a first variable reflectivity base station and a calculated distance between said autonomous mobile work system and a second variable reflectivity base station.

Another aspect of the disclosed technology relates to a method of determining the location of an autonomous mobile robot system comprising: using reflectivity to calculate the location of said autonomous mobile robot system.

These and further features of the disclosed technology will be apparent with reference to the following description and attached drawings. In the description and drawings, particular embodiments or aspects of the disclosed technology have been disclosed in detail as being indicative of some of the ways in which the principles of the disclosed technology may be employed, but it is understood that the disclosed technology is not limited correspondingly in scope. Rather, the disclosed technology includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF SEVERAL VIEWS OF THE DRAWINGS

These and other features of the disclosed technology, and their advantages, are illustrated specifically in embodiments of the disclosed technology now to be described, by way of example, with reference to the accompanying diagrammatic drawings, in which.

Figure 1:
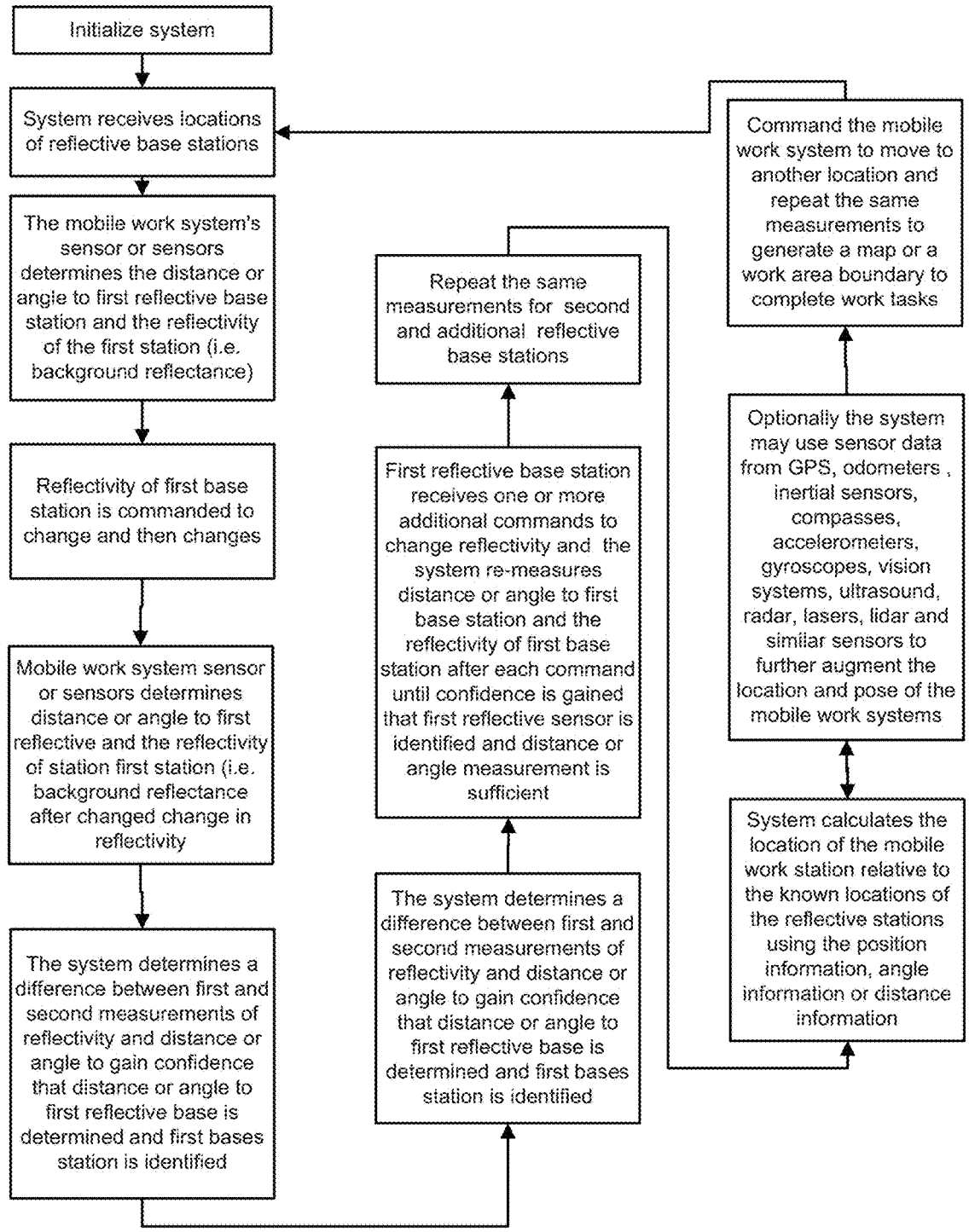
FIG. 1 is a flow chart representing aspects of an exemplary method for determining the distance between the variable reflectors and the mobile work system in accordance with one exemplary embodiment.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF EMBODIMENTS

Aspects of the disclosed technology relate to a method and system for localizing and confining an autonomous mobile work system or systems for performing work in a user defined space is disclosed. In one embodiment, the system includes two or more variable reflective base stations at first and second locations that can modify their optical or electromagnetic reflectivity based upon either an external command via wired or wireless communications interface, or automatically on a regular or asynchronous time schedule under programmed or user settable control. The system also includes one or more autonomous mobile work systems capable of sensing the state of the variable reflectance base stations via sensors such as electromagnetic or optical sensors capable of measuring distance to the reflective base stations.

The autonomous mobile work systems may have variable reflectivity systems, cameras, GPS and other sensors capable of augmenting the determination of the work system's position. Additionally, the variable reflectivity base stations may contain sensors for measuring the distance from the base stations to the autonomous mobile work system and the reflectivity of the autonomous mobile work system. The autonomous mobile work system also may itself have a system variable reflectance. Prior to measuring any combinations of distance and reflectivity, the system is taught or autonomously learns the location of the reflective base stations via user or sensor input, earlier obtained location information or use of an automatic secondary positioning system such as a satellite based system or other local positioning system (global positioning system or GPS). A first reflective state and distance or angle to at least one of the base stations are measured by the reflective distance or angle and reflectivity sensors on the autonomous mobile work system. If this measurement is the initial measurement, it may be considered a background reflectivity and distance or angle measurement. Then a reflectivity change command or a fixed or asynchronous time signal is provided to at least one of the base stations which changes to a second reflectivity state in response to the command or signal. A measurement of the distance or angle and reflectance of the same, first reflective base station is then taken measured again. A difference of reflectivity between the first (or background) and second reflectivity states of the first variable reflectance base station is calculated and measured via the system computational resources or determined by analog calculation via electrical circuits of the electronic sensor system or systems. This difference is stored in a system memory.

The difference between these reflectivity measurements is used to identify the base station which was commanded to change reflectance and to verify that the first base station actually changed reflectance in response to the command or signal. Then after a second command or a second fixed or asynchronous time signal is provided to the first base stations it transitions to a different reflectivity state from the second state and the reflectivity of the first base station and distance between the first base station and the autonomous mobile work system are once again measured and stored in a memory system. The reflector could also be changing reflectivity at a constant or asynchronous rate independent of control signal. A comparison of the second reflective state and the different reflective state are calculated and confidence is gained that the base station of is identified.

This process is repeated as necessary so that the mobile work system can gain confidence it has identified the distance to the location of the first reflective base station which was commanded to change reflectivity. In another instance, the rate of change of the reflectivity could be known or a modulated asynchronous change in reflectivity could be identifiable in a reflectivity measurement. In some instances, measurements of only two reflective states and distances are necessary to identify and determine range to a particular base station. The identification and distance determination process is then repeated for at least one other reflective base station placed at a second known location. Then taking the stored data from the locations of the base stations, measurements and estimates of the distance between the measured base stations and the autonomous mobile work system, the location of the mobile work device can be calculated using a number of different methods of position determination including, but not limited to, triangulation, multi-lateration or trilateration. The mobile work system may use the calculated location information about mobile work device position, the position of the variably reflective base stations and if necessary, in conjunction with other sensors such as GPS, dead reckoning, and on board vision systems to localize, correct position information, map, move the autonomous mobile work system and bound the movement of the autonomous mobile work system within a user taught boundary to perform work such as mowing or cleaning an area. Additionally, the system may include any of the well known physical boundary systems in addition to or in place of user defined boundaries. This system also can be used in conjunction with a teaching method to teach the autonomous mobile work system a coverage area for the autonomous mobile work system based upon location measurements taken during the commands input by a user. Also disclosed is a unified work apparatus comprised of at least one autonomous mobile work system and two or more variable reflective base stations.

Aspects of the disclosed technology recognize that conventional systems have proven over time to be too unreliable, expensive or complex for use in consumer products. Moreover, aspects of the disclosed technology recognize that there has been a long felt need for local navigation systems which are simple to use, reliable and very low cost for use in confining and locating autonomous mobile work systems. The significant processing power (both computational in MIPS and electrical in watts) and the complex electronics and software required for optical vision based location systems and for radio location systems are barriers to the success of these systems.

Additionally, aspects of the disclosed technology recognize that there are a number of factors which degrade satellite based GPS signals which are outside the control of the system user. These include, but are not limited to, atmospheric conditions, multipath reflections, receiver clock errors, orbital errors, satellite geometry and artificial degradation of the satellite signals. Thus, there are many times, situations and environments where satellite based positioning systems are not adequate for sub-meter level autonomous mobile work system positioning and location. Instead, a high performing, low cost autonomous mobile work system localization system needs a simpler more reliable location system. Incidentally, low cost commercially available components that allow for GPS independent confinement and localization just now are becoming available.

For instance, many low-cost radar systems are now becoming widely available. Examples of these systems include ultra wide band and automotive gigahertz bandwidth radar systems. Additionally, with the rise of stealth radar avoidance technology and the ability to vary or control the radar cross section of an object is possible either by electromechanical or electronic means, it has become easier and lower cost to vary the radar cross section of an object. Furthermore, one can employ, for example, radar reflectors and enhancers as currently deployed in marine applications, which could be used to modify the radar cross section of a variable radar reflector. By using these technologies one can design a triangulation, multi-lateration or trilateration system for an autonomous mobile work system whereby the system can identify variable location base stations via wireless commands to change the reflectivity of those base stations.

In the field of consumer based, area-confined autonomous mobile work systems, it is possible for the system to have multiple separate base stations which can have system controlled variable reflectivity. In contrast, many typical autonomous mobile work systems require location systems which are much more expensive and are independent. This requirement leads most autonomous mobile work system designers away from systems that have physically separate system parts which change a physical characteristic based upon timing or a command. However, the autonomous mobile work system disclosed herein requires only slowly moving mobile work systems that have a time to acquire reflectivity and distance or angle measurements from independent variable reflectance base stations with reflectance being controlled by the system itself and the location of the base stations being known to the system.

In the past several systems exist that have higher power and expensive active RFID tags or very short range passive RFID tags. These systems are non-optimal due to customer maintenance needs, limited range of operation and higher cost transmitter and receiver electronics. Moreover, range limitations of short range RFID tags make them non-optimal for use in location systems.

The system disclosed herein could be used for automated mowing, cleaning, or monitoring of an area or for locating people or objects within that area. One of the key advantages of this system is that the system can self-identify the reflectors so that system cost, computational power of location determination can also be greatly reduced. The amount of system memory can be greatly reduced and no external computing such as cloud computing would be required. Unlike complex vision systems, databases of known objects or textures is not required since the reflectors are controlled and have a known location in relationship to the environment. Furthermore, this system eliminates the need for complex cloud computing infrastructures and reliance upon multiple computer systems for calculating position as used in today's autonomous vehicle systems. The sampling time, computational time and number of calculation sequences can be kept very low, thereby freeing computational resources for other tasks such as safety, security, user interfaces and mapping algorithms. A surprising result is that low cost but high quality radar or optical sensors are capable of locating an autonomous mobile work system can be obtained by the simple concept of controlling, identifying and determining distances to external variable reflectors via simple low cost sensing and control of reflectance with a minimum of computational power.

Moreover, the system is readily extensible, and is not limited to fixed base stations. The system can be used with multiple user defined or system learned locations of fixed reflectance points to augment system accuracy and precision. For example a user can identify a fixed object in the autonomous mobile work system's field of sensor detection angle which could eliminate one of the variable reflectors. This identified object could also be a special unchanging passive reflector, visible fiducial or object of specific, shape, color or spectral reflectivity response. Additionally, the system can allow for easy movement of the reflectors either by the autonomous mobile work system itself or by an external user. Also, as many variable reflectors as necessary can be added to the system to allow for larger and larger coverage areas and multiple charging stations can be added, as can multiple mobile work systems. Multiple autonomous mobile work systems with variable reflectors can be added, moved by the system and used to increase accuracy and extend system range to create a swarm of mobile work systems, and variable reflective base stations.

The implementations described herein solves the above problems and limitations of corrected and non-corrected global positioning systems, dead reckoning, electromagnetic dog-wires, and complex vision systems as used mobile work system location in part by using off the shelf optical cameras or very low cost radar systems in conjunction with independent base stations having system controlled variable reflectivity. By means of the system either receiving or determining the location of these base stations via vision systems, local or global positioning sensors, the system is able to calculate the position of a mobile work system with or without user input. The sensors for the location system could be located on the mobile work system or on one or more of the base stations. Additionally, the reflective base stations could be included on one or more mobile work systems or all systems could have variable reflectors.

The autonomous mobile work system, at least in part, comprises one or more autonomously movable work systems and at least two stations with variable reflectors. The work system could be an autonomous mobile cleaning system or an autonomous mobile work system for security and surveillance, mowing, grass collection, leaf cleaning or the like. The system contains one or more distance sensing systems such as a gigahertz radar system, ultrasound system or ultra wide band radar system, or stereo camera system for measurement of distance. The variable reflectors could be optical reflectors such as standard reflective liquid crystal panels, bi-stable liquid crystal panels such as cholesteric liquid crystals, magnetically changed variable reflectors, curved reflective panels that transition from straight to curved, diffractive variable diffractive optics, mechanically changed in area or one of many other mechanisms for changing the size, shape, beam steering, or gathering of light to increase their reflectivity. The system could rely upon sunlight, ambient light or system provided illumination to allow stereo camera or cameras to measure the distance between the reflector and other parts of the system. Additionally laser illumination of the reflectors could be used. This reflectivity is varied upon command of the system based upon a fixed time signal, external mobile work system command or asynchronous time signal. By use of this system the positions of the reflectors can be used to calculate the angle between the variable reflector and the mobile work system. The change in reflectance may be spatial or directional. For example the curvature of a surface, pattern of reflectance or direction of a reflector could be changed to cause a change in reflectance. Diffractive or resonant techniques could also be used to change the amount of light reflected to the sensor. A resonant laser cavity or an adjustable multi-plate fabry-perot inetterfermoetric diffractive reflector could be used wherein the plate separation could be modified to create a variable reflector. The curvature of a mirror could be changed by capacitive, electrical or electromechanical means to alter reflectivity of a reflector. Physical orientation of a reflector could be used, such as by a reflector being moved by a motor or a reflective surface being covered by a shutter. Also the aperture of the reflective surface could be varied in order to change the reflectance of the system.

In some embodiments, the reflectivity of the base stations could have a unique time dependent variation of reflectivity that is detectable via the autonomous mobile work station's reflectivity sensors. The frequency of variation in reflectivity could be unique for each base station, allowing identification of a particular base station as the system knows or was taught the reflectivity of every base station present in the system. Well known modulation and frequency detection algorithms and circuits could be used to detect the variation of the reflectivity and to calculate the variation of a particular base station's frequency. Additionally the variation of the base station reflectivity could be modulated with an encoded signal which could be detected and used to identify it as a particular base station. The sensor system would be capable of de-modulating the information from the measured reflectivity of the system. Being a passive reflector has the added benefit of keeping the system cost and power low while still having the ability to indicate the identity of individual base stations for use in localization of autonomous mobile work systems.

In another embodiment, radar reflectors can be made to have a variable radar reflectance cross section by the cross section being physically modified or electromagnetically charged and discharged. In this instance one or more low cost radar systems can be used to detect the distance or angle and reflectivity of the mobile work system or base station with variable radar reflectance cross section. The speed of the radar cross section variation could be from slow statically changing states up to high frequencies. The advantage of using radar system is their ability to measure through obstructions such as fences and walls, and their ability to see through dust, dirt and many weather conditions.

An included optical system may be used with visual user identification algorithms for system theft deterrence, as theft of autonomous mobile work systems remains a problem. The user could program the system to recognize a fixed feature of the property and thereby require the system to find and recognize that fixed feature of the work area before allowing work operations to be performed again by the mobile work system. Also, any included radar or vision system can have dual use for location of obstacles, obstacle avoidance, or identification of moving objects.

One aspect of the disclosed technology relates to a method wherein a first mobile work device (e.g., a robotic lawn mower) and at least one or more reflective boundary stations are located within an area (e.g., a user-defined or predefined area, such as a yard). The method further includes providing the location of the variable reflectors placed in a work area are provided to the system via user input, internal or external location system. The method includes completing a calibration sequence allowing the system to identify an orientation and location of the variable reflectors. The method also includes taking a background or first measurement of at least a first and possibly one or more additional reflectors. The method also includes changing a first variable reflector's reflectance state via timing signal or command signal. Measuring a distance or an angle and a reflectance between the mobile works system and at least one variable reflective base station is taken to the first reflector.

Next, calculating a difference in reflectance of the background and the second measurement. The method includes changing the first variable reflector's reflectance state again and again measuring this station's reflectivity, and angle or distance. Then the method further includes comparing the first measurement to the second measurement and if necessary to the background measurement. Storing the distance or angle in memory. If necessary, the method may include commanding one or more of the variable reflectors to have a third, or even fourth, fifth and more, reflective state or a first (original) reflective state and then measuring the distance or angle and reflectivity and these subsequent measurements are placed in a system memory.

The method includes the steps of repeating the sequence of changing and measuring and comparing as necessary until the mobile work system gains confidence the distance or angle to the first changed variable reflector is determined. The method further includes repeating this sequence of commanding changes in reflectance and repeating measurements with any additional variable reflective base stations as necessary to gain confidence in the mobile work system position and storing this data in a memory.

In some instances the method includes identifying or providing an indication of a fixed reflective object such as a house, tree or other stationary object and using this in place of one of the variable reflectance base stations. The method also includes a method of measuring or receiving a distance between at least one variable reflector and an identified fixed object. The method also includes commanding the autonomous mobile work system to move within a close proximity of the fixed object location. A distance correction is measured to the fixed object location. A second measurement of distance or angle and reflectivity is taken from the fixed object to a variable reflectance base station. This is used as a background measurement.

The system commands a change in reflectivity of the variable reflectance base station and another measurement of the variable base station's angle or distance and reflectivity is taken. The location of the variable base station also is known, acquired or input by the user. Also the location of the fixed object is known, learned or input by the user. The mobile work system moves to a third known position as input or learned by the system. Then the method further includes again repeating the described sequence of measurement of distance or angle to and reflectivity of the variable reflectance base station are taken. An orientation is calculated to the fixed object in relationship to the new position of the mobile work system and the fixed object are completed. The method includes commanding the mobile works system to turn an angle at which the distance measurement and reflectivity sensors are capable of measuring the reflectivity of and distance or angle to the fixed object. This method is used to verify, calibrate and use the combination of at least one variable reflectance base station with a fixed object to track position and construct a work area map which is stored in system memory.

Furthermore, the method includes determining and mapping location, and orientation of any of the number of variable reflective base stations or additional mobile work system with variable reflectors with respect to the mobile work system; commanding a change of angle to place the system sensor in a position to measure angle or distance and reflectivity of at least one variable reflective base station or additional mobile work system with a variable reflector based upon a calculation of orientation and location obtained by comparing the mobile work system's current location to a map contained in a system memory which contains the position of the variable reflective mobile base station or stations. The method of map creation also includes inputting or determining the location of the variable reflective base stations, mobile work system and a system working boarder determined from user input.

The system and method allows for user input of obstructions and positions where a mobile work system may not detect a variable base station. The system then calculates lines of sight from each potential position of the variable reflective mobile base station and provides an indication where the mobile work system cannot obtain a measurement of distance or angle and reflection. Then map areas are marked in memory wherein the mobile work system cannot expect to obtain a measurement of angle or distance. As the mobile work system traverses the work area, it compares its location to the map and determines if it is in a keep out area. In accordance with an exemplary embodiment, the method can further include using a combination dead reckoning, GPS sensors or optical sensors to provide a path to traverse so the system can exit the keep out area.

If necessary, the method may include commanding the orientation of the mobile work system to change in order to correctly discover and measure one or more of the variable reflectance base stations. This would require a sequence of first turning the mobile work system or the sensor on the mobile work system to an orientation, attempting a sequence of identifying the first variable reflector's changing reflectance and if the reflector is not found, again changing the orientation of the reflector and attempting location through the above disclosed measurement sequence. Additionally a map, a history of orientations and a matrix transform may be performed to re-orient the mobile work system to more easily acquire measurements of one or more of the variable reflectance stations. The system can determine angle via at least one of an onboard compass, a gyroscope or accelerometer, dead reckoning, environmental pattern observation, comparison and mapping via video camera or wheel odometers.

If the measurement sensor's field of view allows, the measurement of changed reflectance and distance can be done for at least a second reflector simultaneously and the sequence of measuring as described above can be completed for the second variable reflector. If it cannot be done simultaneously, the mobile work system, if necessary can change its physical sensor orientation in order to locate and measure a second variable reflector's reflectance, distance or angle and the described measurements of the second reflector are taken. The system's current knowledge of its location in relation to a stored map can be used to augment orientation selection and minimize turning angle in order to obtain a direction for sensing of at least a second variable reflector. The second reflector changes its reflectance based upon a time signal or a command signal. The measurement of the second variable reflector's reflectance and distance or angle from the second variable reflector to the mobile work system is measured again.

Measurement sensors for the mobile work system can be of the upward viewing stereo camera type with 360 degree reflector for 360 degree viewing. This allows the mobile work system to identify the reflective base stations all at one time regardless of the system and to identify any obstructions that may be in the line of site of one or more of the reflective base stations. It also allows for 360 degree object detection and viewing. Additionally, the radar sensor may be able to sense in 360 degree sensing angle via either specially designed antennas, or rotating radar sensor. Or the radar may have a fixed direction and the autonomous mobile work system may rotate to accommodate radar sensing.

After a complete set of distances or angles from the mobile work system to the variable reflectors are taken, a location of the mobile work system is calculated. Methods such as triangulation, multi-lateration or trilateration are used to complete the calculation of this distance. This sequence can be repeated as necessary to map, move or locate the autonomous mobile works station. Methods of filtering position, estimates of position and path planning can include algorithms such as digital signal processing filters, FIR filters, IIR filters, Kalman filters or other similar methods. Additionally statistical methods can be applied to the estimates of position to give a confidence that the determined location is at least within an acceptable error of the expected position. Furthermore, well known curve fitting algorithms can be employed to plan a path between at least a first and a second map location at which the system can determine using the disclosed variable reflectance location method. Curve fitting techniques include best fit via interpolation, smoothing, regression analysis, or statistical interference. Also paths between boundaries can be mapped via extrapolation or algebraic solutions to predicted curve fits. The error between curve fit and measurement of location can be used to develop a system model of the autonomous mobile work system's speed and orientation for creating adaptive filters and filter parameters for Kalman filters or particle filters. Furthermore a probability distribution fitting algorithms can be used to estimate the probability that the system is working obtaining accurate position and orientations based upon commanded velocity and orientation.

The mobile work system then may move to other locations and again determine its location relative to the variable reflectors. Additionally, the variable reflective systems and mobile work system or systems may contain GPS systems, RTK-GPS system or other error correcting GPS system to allow for a secondary accurate positioning of the mobile work system for obtaining or improving position information of the reflective work systems and the mobile work system. All of the above listed systems, mobile work system and variable reflector systems may contain wireless or wired communications links to share position information and to provide data to position correction algorithms. These communications systems may be point to point, broadcast, full or half duplex. Each mobile work system, variable reflectance station and charger may have a unique identification code.

They system may also contain wireless encryption data transfer systems to prevent unauthorized access to the communications between the system parts. Correction algorithms such as real time kinematics or differential GPS could be used to correct the location information. Moreover, an external command system may enable commands to change a reflectivity of any of the system's variable reflective base stations, add a variable base station, change the identification number associated with a variable reflectivity base station via user command or preprogrammed list of associations between base station and identification numbers.

To teach the system a work boundary, the system may comprise a removable sensor system which can be removed from the mobile work system. The sensor system has at least one of a, position location, ranging, reflectance or angle measuring sensor for measuring the distance, reflectivity and angle to the variable reflectors. The removable sensor system may contain a GPS system for improving the location calculations of the sensor for perimeter location determination. Additionally the sensor may have means for communicating with a smart phone. The removable system may contain an inertial measurement unit to detect motion for correction of location. The smart phone's GPS, cellular, Wi-Fi, wireless and location systems and algorithms may be used in conjunction with the sensor's own capabilities to correct or improve the boundary location measurements. Also the smart phone may have an application to store the location information, use allow the user to view the final boundary, and modify it, transfer it to a secondary computer for storage and modification and return it to the system as a completed work boundary. The same methods may be used to teach the mobile work system areas in which not to enter on the interior of the boundary or areas where the system may travel but not complete work to go between multiple work areas.

Once the removable sensor system is detached from the mobile work system, the user can proceed to move about the perimeter of the work area. The user can provide an indication via user command to inform the system the path being traveled is part of the boundary or to tell the system that it is not part of the boundary. The system, in the same way as above, takes measurements of location, stores locations on the perimeter and maps a boundary of the work area. The system then constructs a work perimeter based upon the tracking of the removable sensor. The system can command the user to pause, point the sensor toward the variable reflectors, and then proceed as necessary to accurately obtain location data or to correct a GPS sensor embedded in the removable sensor system. Upon completion, the user can command the system to close the work boundary and return the unit to the mobile work system.

The positioning sensor system may also employ filtering software to allow smoothing correction of the stored location methods and may have a line fitting algorithm to create a closed path around the autonomous mobile work system or station's indented work area or areas. The removable sensor system may have a memory for storing the boundary and map of the autonomous mobile work system's intended work areas, keep out areas and non-work travel areas. This information may be transferred to a secondary computing device for correction, augmentation, mapping, post filter processing or verification. This information may be transferred to secondary computing systems via removable flash memory, wireless, serial link, I2C, SPI or CAN bus other common communications protocol. Additionally, the system may use the included variable reflective systems to encode messages or transfer information between the autonomous mobile work systems and variable reflectance base stations.

Also, the user may connect the system to a separate computer or mobile phone for later storage, review and modification of the boundary information. This information map can be provided via wireless link, Wi-Fi, Ethernet, Bluetooth, USB memory stick or flash memory card to the system for commanding the mobile work system's boundary and movement patterns.

Each of the variable reflectivity systems may comprise one or more of the following a GPS system, a wireless transmitter, wireless receiver, wired transmitter and/or a wireless receiver. Also the variable reflectors can contain electronics, motors, variable reflectors, mechanics and optical systems suitable to change the reflectivity of the system. In one embodiment the system uses the GPS receiver to obtain the variable reflectivity system's location.

In another embodiment the mobile work systems can contain at least one GPS sensor which is used to map and verify the location of the variable reflectance base stations. In at least this instance, the variable reflective base station is moved to within a close proximity to a variable reflective base station. Then the GPS location of the mobile work system is then indicated as the non-corrected variable reflectance base station's location, a distance from the mobile work system and variable base station are measured or entered and an orientation of the mobile work system is recorded using orientation sensors included on the mobile work system and stored in a memory. The mobile work system is moved to a second location proximate to the variable reflectance station, a second GPS reading and a measurement of distance to and orientation of the variable reflectance base station is recorded in a memory. Then using standard location mathematics as highlighted above, the location of the variable reflectance base station is determined and recorded in a memory. The mobile work system repeats this method in to obtain the location of additional variable reflectance base stations. Moreover, the location of the variable reflectance base stations may have been known prior to this measurement, allowing for correction of the autonomous mobile work system's indication of the GPS indication of position.

In another embodiment, a user could connect a mobile phone to each base system in turn and command it to obtain GPS location information from the phone. This connection could be physical via audio output jack, USB connection, serial connection or wireless connection via Bluetooth, Zigbee, WiFi or other similar wireless link. The system would use a GPS receiver or receivers to correct the location of zone variable reflectance base systems in conjunction with a GPS contained within another base system at a fixed distance from the first base station or a GPS on the mobile work unit or a fixed external base station as contacted via the internet.

Additionally, the mobile work system would include at least some of the following systems, an electrical drive system, motors, gearing gears, control module, radar sensor, ultrasound sensors, Wi-Fi, wireless links, can bus, mod bus, lin bus, rs-232 serial link or similar communications links. Also the system could include inertial measurement units, compasses, accelerometers, gyroscopes, odometers, stereo cameras, radar and the like for creating multi sensor algorithms for correction of the location information obtained by the variable reflectance location system. The mobile work system may also contain a battery and power system comprising at least one of a battery, fuel cell, capacitor or other commonly known storage element.

In another embodiment, the autonomous mobile work system would contain a mechanism to pick up each of the reflective base stations in turn or together, move them to another location, drop them and re-calibrate the location of each of these variable reflective base stations. Calibration of position information could be completed with the GPS based method described above, through the use of multiple mobile work systems or through user input. This would allow a larger coverage area and a more robust location system that could account for complex geometries and systems that allow for coverage around a home or around obstructions in a work area.

In another embodiment the system will have autonomous multiple mobile work systems, which each have variable reflectors, wireless links, drive systems, computing systems, distance and reflectance measurement systems and memory systems, mapping and path planning systems. Additionally, the system may have more variable reflective base stations. These mobile work systems can each measure the distance and location to the other autonomous work systems and to the variable reflectance base stations. When the number of work systems is greater than two, the mobile work systems can be used to calculate the positions of all the mobile work systems. Using a similar position location algorithm the location of each mobile work system can be calculated. At least two of the mobile work systems remain fixed at known locations and the third location is calculated. Then either the first or second work system can be moved while the third workstation is able to be moved and then the position of the third work system is calculated.

With the addition of variable reflectance base stations, they can be used as an initial positioning location anchors to provide a baseline calculation of at least two of the mobile work system for calculating the position of at least a third mobile work system. Moreover an identified fixed object could be used as another means for correct the location of each autonomous mobile work system. This allows round-robin movement of the mobile work systems to increase the coverage area to an unlimited size or a size only limited by battery power of the system.

Additionally, the mobile systems could have charging apparatus for transfer of power from at least one of a first mobile work system to at least a second mobile work system to allow for larger coverage area. In this instance, a first mobile work system is charged via a fixed charge station which may be a variable reflective base station. Because the energy required to move the autonomous mobile work systems is lower than the power used during the work process such as mowing, blowing, vacuuming or the like, the energy stored in the batteries of a first mobile work system could be transferred to at least a second mobile work system.

In another embodiment, one of the reflective base stations could also serve as a charging station. The charging station could be connected to a power outlet or could have an alternative energy source such as wind, bio-fuel cell fueled by grass clippings or plant debris or solar power. This charging station could ether be larger than the mobile work system or smaller. In the instance the charging system is smaller than the mobile work system; the mobile work system could lift and attach the charging station to the mobile work system or stations allowing charging of the batteries.

Moreover, the charging stations can be configured to accommodate swappable batteries, wherein the battery packs could be exchanged for charging and alternately working. A first battery pack can be charging while a second battery pack can be picked up by the autonomous mobile work system. The mobile work system would contain a temporary charge storage system derived from one of an indicative coil, a capacitor, a fuel cell or a battery. This storage system can be charged by the primary batteries while attached to the mobile work system.

The system first charges the secondary power source with an adequate power level to charge move the autonomous mobile work system without the primary batteries. The charging station is places within the defined work area of the autonomous mobile work system. When the voltage or capacity of the first battery pack reaches a preset level, the autonomous mobile work system uses its knowledge of the location of the charging station as indicated by the user, or as found via a variable reflector attached to the charging station through scanning the environment for commanded changes in reflectivity. Once found the mobile work system plans a path to the charging station, and a command is provided to the mobile work system to travel to an open charging port of the charging station. The mobile work system's primary batteries are placed into contact with a first charging port on the charging station and released from the mobile work system. Then the autonomous mobile works station would move to a second battery back being in a charged state via power stored in at least the secondary power storage element. Then the autonomous mobile work system proceeds to load the at least second set of charged primary power cells into the autonomous mobile work system. The autonomous mobile work system proceeds to complete the commanded work task in the defined work areas as necessary under the power of the second set of primary power cells.

In another embodiment, the base station can be smaller than the autonomous mobile work system and could picked-up for connection of the mobile work system. Typically most charging base stations are devices which the autonomous mobile work system docs with. However, in order to save overall systems cost, the base charging station can be smaller than the autonomous mobile work system and could be picked up by the autonomous mobile work system. The autonomous mobile work system could then connect the power connectors to the autonomous mobile work system for charging of the system batteries. This same charging system could be used to charge re-chargeable batteries in the other non-power connected variable reflector stations. They could be moved to locations within the yard or could move under their own power via an independent drive system.

In another embodiment, the reflective base stations and the mobile work system all can include reflection and distance sensors and variable reflectors. In this way the combination could verify location of a number of mobile base stations and variable reflectivity base stations. These base stations and mobile work systems could be moved or could move in order to increase the coverage area of the work systems.

In another embodiment, a combination of both optical sensors and radar ranging systems are used together to calculate the location of the mobile work system or systems. Additionally secondary inertial measurement units could be used to augment the position calculation from the combination of the optical sensors ad radar ranging sensors. The optical sensors could be a camera, a stereo camera, or a polarity of cameras capable of measuring distance, shape, size, color, spectral reflection content or a combination of these measurements. The mobile work system can include a camera, a stereo camera or a plurality of cameras capable of locating one or more of the variable reflective base stations. The reflective work system could vary reflectance by intensity of light or by reflected spectral response.

The location of the base station can be completed using, for example, visual pattern and object recognition means. Upon location of the base station, the mobile work system would then orient itself so that a radar sensor is capable of sending a first pulse to at least one of the variable reflective base stations. An orientation of the mobile work system is saved in memory. A first command is sent from the mobile work system to the base station to command a first reflectance state of the mobile base station. A first response from the first variable reflectance base station is sent to the mobile work system. Then a first measurement of the base station reflection and distance is taken and stored. Next, via wireless link a command is sent to the first variable reflectance station. In response to this command the station changes its radar or cross section to a second radar cross section. A radio communications response is sent from the base station to the mobile work system indicating that the reflectance has changed. The mobile work system receives the command and then this mobile work system takes a second radar reflectance measurement is taken, stored and compared to the first radar reflection measurement. This set of measurements is used to for verifying distance from the mobile work system to the base station and a change in reflectivity, the variable reflectance station is commanded to change the reflectance to the original state. Again an acknowledgment message is sent from the base station to the mobile work system and in response a measurement of reflectance and distance to the base station is taken. This measurement increases the confidence that the correct variable base station is selected and the distance to the proper base station is measured. Each base station has a unique identification address that is encoded into the wireless messages.

In another embodiment, the unique radar signature (spectral frequency response) or the unique visual appearance of the reflector allows the system to verify that the correct base station is activated, measured and identified. In this instance the radio base station only must transmit a radio message with a unique address for the variable reflectance base station and the variable reflective base station only requires a radio receiver rather than having a receiver and a transmitter.

In another embodiment, the wireless link may be eliminated and replaced with variable reflectors on the mobile autonomous mobile work system, a variable reflector on the base station, and one or more cameras on each of the reflective base station and mobile work system, respectively. A signal may be encoded or added to the variable reflectors in order to transfer messages between the system components.

In another embodiment, the system may be taught with a compass and user input or GPS to know the orientation and direction of the variable base stations when the mobile work system is at a particular location. These orientations are then used to calculate mobile work system pose relative to the variable reflectors. Then before each measurement of a particular base station calculates the proper orientation and turns the mobile work system to that orientation in order to obtain the measurement of reflectivity and distance to the variable reflectance base stations.

Also disclosed is a unified work apparatus comprised of at least one autonomous mobile work system and two or more variable reflective base stations.

In accordance with on aspect of the disclosed technology, an autonomous mobile work system for performing work in a user-selected area can include one or more of the following elements without departing from the scope of the disclosed technology.

a. A mobile work device that includes one or more of the following elements.
  i. Motor drive system
  ii. DC or brushless electrical motor
  iii. Gearing system
  iv. Four Wheels
  v. Servo steering system
  vi. Cutting, vacuuming, sweeping or cleaning system
  vii. Power converters and dc-dc converters
  viii. Multipoint wireless transceiver such as a IEEE 802.15.4 Extended Range Module
  ix. Optical encoders
  x. Visual odometer sensor
  xi. Sensor board or boards including one or more of the following elements.
    1. Three axis accelerometer
    2. Three axis Gyroscope
    3. Three axis Magnetometer
    4. Tilt sensor
    5. Rain sensor
  xii. User interface
    1. Liquid Crystal Display
    2. Control buttons
  xiii. Enclosure
  xiv. Frame
  xv. Single board computer
  xvi. Servo and Motor Control boards
  xvii. Wi-Fi connection
  xviii. Emergency stop button
  xix. Bump sensor
  xx. Radar Sensor
  xxi. Stereo Vision system
  xxii. Can Bus
  xxiii. Serial Bus
  xxiv. Ultrasound range sensors
  xxv. Charging connections b. At least one variable reflectivity base station including one or more of the following elements.
  i. A system controllable variable radar reflector
  ii. A control board including an embedded computing system
  iii. A power system for powering the base station
  iv. A wireless receiver or wireless transmitter
  v. A GPS receiver
  vi. A GPS antenna
  vii. A radar reflector with variable radar cross section c. At least one charging base station including one or more of the following elements.
  i. Contactors for contacting mobile work station charging connections
  ii. A control panel
  iii. A Wi-Fi Receiver
  iv. A Ethernet receiver
  v. Multipoint wireless transceiver such as a IEEE 802.15.4 Extended Range
  vi. A radar reflector with variable radar cross section
  vii. A power system
  viii. A charging system
  ix. A housing for containing the electronics
  x. A motor and mechanical linkage for moving the orientation of the variable reflector from at least a first to at least a second or multitude of reflectivity states.

In accordance with one exemplary embodiment, a method of determining the location of an autonomous mobile work system can include one or more of the following steps.

a. A user providing the location and orientation of a first variable reflective base station.

b. A user providing the location and orientation of a second variable reflective base station which is located at a different location than the first base station.

c. The autonomous mobile work system being at a third location, different than the first and second locations of the first and second base stations.

d. The autonomous mobile work system providing a command to the first base station to change its reflectivity.

e. The base station then changing its reflectivity in response to the command.

f. The autonomous mobile work system then measuring and storing the reflectivity of the first base station and distance from itself to the first base station.

g. The autonomous mobile work system then commanding a change in base station reflectivity to a second reflectivity state.

h. The base station then changing its reflectivity in response to the command.

i. The autonomous mobile work system then again measuring and storing the reflectivity of the first base station and distance from itself to the first base station.

j. Then the mobile work station commanding a change in base station reflectivity to a different reflectivity state (either the first or a third state).

k. The autonomous mobile work system then again measuring and storing the reflectivity of the first base station and distance from itself to the first base station.

l. Then the system computing system calculating a difference in reflectivity of the base station after each commanded reflectivity change.

m. This method is repeated as necessary to verify the autonomous mobile work system's distance to the first base station.

n. The autonomous mobile work system's radar sensor is turned to the second orientation in a direction of the second mobile base station to allow measurement of the second base station's reflectivity and orientation.

o. The autonomous mobile work system proceeds to repeat the identification of the second base station and measurement of distance to the second base station.

p. The known locations of the first and second base stations and the measured distances are used to calculate the position of the autonomous mobile work system.

q. The process is repeated as necessary to obtain the system location with a bounded area.

r. The method further including adding at least a third variable reflectance base station in a location different from the first and second base stations and the autonomous mobile work system using commanded changing reflectivity and measurements of distance to either increase the autonomous mobile work system range or increase the accuracy of the autonomous mobile work system's location calculations.

It will be appreciated that multiple mobile work devices can be employed without departing from the scope of the present invention.

In accordance with one exemplary embodiment, a system comprising a plurality of autonomous mobile work devices each having a system controlled variable reflector can include one or more of the following elements.

1. The variable reflectors being a radar reflector
   a. The reflection being changed by charging and discharging a plate
   b. The reflection being changed by moving or rotating a mechanical system
   c. The reflection being moved by magnetic means
2. The variable reflector, in the alternative, being a optical reflector
   a. The reflector being a liquid crystal panel with multiple reflectance states and patterns
   b. The reflector having a variable aperture
   c. The reflector having its reflectance changed by moving or rotating a mechanical system
3. The variable reflector having a motor for moving the orientation of the reflector.

ii. The system further having at least one base station capable of connecting to a mobile work systems and charging the mobile work system's power source.

iii. The system having computing resources and wireless communications system capable of commanding a reflectivity variation of at least one of the mobile work systems.

iv. The autonomous mobile work systems also having reflectivity and distance sensors capable of measuring the reflectivity of a variable reflector and the distance from the mobile work system to a variable reflector.

v. The autonomous mobile work systems also having a wireless communications system for exchanging data between the system components.

vi. The autonomous mobile work system having a unique identifying code capable of uniquely identifying the mobile work system from all other system components vii. The autonomous mobile work systems having a motor drive system for moving the mobile work system.

viii. The autonomous mobile work system having at least one rotational servo for controlling the orientation of at least one direction wheel.

ix. The autonomous mobile work systems having at least one cutting mechanism for cutting grass.

x. The autonomous mobile work system having a vacuum for collection of grass clippings, debris, leaves or other material located in a user defined area.

xi. The autonomous mobile work systems also having a rechargeable power source capable of providing power for driving system sensors, processors, and motor drives xii. The mobile work systems further having global positioning sensors for determining position based upon global positioning system satellite signals xiii. The mobile work system also having tilt sensors, odometers, gyroscopic sensors and/or accelerometers for determination of system motion, orientation and augmentation of location information.

xiv. The system further having fixed location reflective base stations each having a location either input by a user or determined by system sensors and computations.

xv. The system further having multiple microcontrollers for sensor conditioning, motor control, and calculation of position based upon sensor data xvi. The system having at least one control panel for defining work area, controlling work schedules, determining system diagnostics and controlling system components and parameters xvii. The system further having a wireless link enabling communication with the system via smart phone, PDA, computer or other wireless control device or mobile communication device.

xviii. The system further having storage means for storing computer code, work data, mapping and schedules xix. The system also having computing resources and circuits for calculating location, orientation, avoiding obstacles, determining movement paths and determining work boundaries xx. The system further containing a camera for allowing identification of a variable reflection base station xxi. The system having a memory for storage of a map for multiple locations for mowing.

In accordance with one exemplary embodiment a system for determining location having a variable mobile work device with variable reflector or variable color can include one or more of the following elements.

1. A device or system for completing a task in a defined area such as mowing, cleaning or vacuuming, including one or more of the following elements.
   a. a mobile work system containing a variable reflector
   b. the mobile work device further including one or more of the following elements.
     i. a drive system
     ii. a computer control system
     iii. a wireless communications link to a base station
     iv. an energy storage system
     v. tilt sensors
     vi. a gyroscope sensor
     vii. an accelerometer system
     viii. a compass
     ix. three or four wheels
     x. at least one servo motor for positioning at least one directional wheel
     xi. a user control panel
     xii. a system variable optical reflector having different reflective color based upon a system command
     xiii. a system variable radar reflector having a different radar cross section based upon a system command
     xiv. an ultrasound object detection system
     xv. visual speed sensor
     xvi. a charger interconnection system
     xvii. a rain sensor
     xviii. a work scheduling system
     xix. a Bluetooth wireless link to a Bluetooth based controller
     xx. a global positioning system signal receiver
     xxi. a grass cutting blade system
     xxii. an object bump sensor
     xxiii. an ultra wide band radar object detection sensor.
     xxiv. An electric wire confinement system
     xxv. A magnetic wire confinement detection system c. At least one remote reflection and distance sensor base station including one or more of the following elements.

i. The reflection and distance sensor being capable of scanning the environment to identify the mobile work system to cover a defined work area ii. The sensor system comprising a servomotor for rotating the reflection and distance sensor by 360 degrees.

iii. The base station having a wireless link to communicate with the mobile work station iv. The base station having a controller programmed to control the sensor system, to analyze snapshots of the work area's reflection profile, and to communicate with the mobile work station v. The base station controller commanding the mobile work station via the wireless link to change to a first known color.

vi. The base station controller commanding the sensor to scan through sufficient angle to identify items having the first commanded color.

vii. The base station controller upon identifying a remote object of the first commanded color and recording the scan angle of the first color, then commanding the mobile work station to stop moving and to change to a second color.

viii. The base station then using the scan angle information to scan the same angle for the second color.

ix. If the second color is identified at the same location as the first color, a distance measurement to the mobile work station is recorded.

x. The base station then commands the mobile work station to once again change color to the first or another color.

xi. The system then identifies the mobile work station as having changed color in response to the command to change color and a second distance measurement is taken.

xii. The first base station having an shape or indication that allows it to be placed at the same angle as at least a second base station.

d. At least a second remote reflection and distance sensor base station including one or more of the following elements.

i. The second remote base station having a memory location indicating the distance from the first base station.

ii. The second base station having a controller capable of controlling the rotation angle of a reflection and distance sensor via a controlled servo motor.

iii. The second base station being placed at a second angular direction to the first base station.

iv. The first base station communicates with the second base station and mobile work system via wireless radio link.

v. The controllers each receive and send messages regarding sensor angles, mobile work station speed, color and distance information.

vi. The second base station controller calculates the proper scan angle of its sensor system based upon the known distance from the first sensor, the scan angle of the first sensor and commands the sensor to turn to this angle.

vii. The second base station scans the mobile work station to verify color and measure distance from the second base station to the mobile work station.

viii. The second base station, upon identifying an object of the expected color of the mobile work station, communicates that an object of the correct color was detected at the calculated angle. Then a distance from the second base station may be calculated or measured.

ix. Then the system calculates the location of the mobile work station in relationship to the fixed base stations and stores this location in an area map.

e. Based upon work requirements and coverage area, the system commands a rotation angle and speed to the mobile works station in order to facilitate completing work it the defined work area.

One aspect of the disclosed technology relates to a system for location having a variable mobile work device with variable radar reflector.

In accordance with one exemplary embodiment, a system for determining the location of a mobile robot relative to two sensing elements with a known location and separation includes one or more of the following elements.

An autonomous mobile robot with a system controllable radar cross section

A radar system with one or more radar sensors capable of measuring the radar cross section and distance to a mobile robot having a known separation distance between the sensor and a fixed location or between the sensors and known location of every sensor A wireless communications system which can exchange data and commands between the radar sensor or sensors and the mobile robot, each of which containing a radio transceiver.

A microcontroller or combination of microcontrollers working together as a microcontroller system programmed to send control commands and received data from to each of the radar system and the mobile robot The microcontroller system being programmed to send a control signal to the mobile robot to stop moving and to continuously vary the reflectance of the mobile robot The microcontroller system being programmed to read the data from the radar system and verify the distance or angle to the mobile robot by identifying the time variation in the reflected robot sensor.

The microcontroller system using the distance or angle information to determine the location of the mobile robot The mobile robot having additional sensors including accelerometers, gyroscopes, bump sensors, cameras, inertial measurement units, odometers and ground speed sensor and compass.

The mobile robot using the data from these sensors in conjunction with a map of the area, stored travel information and location calculations to augment the location and speed of the mobile robot Then the microcontroller system taking data from the additional sensors to allow estimation of speed and heading.

The microcontroller then calculating a projected location based upon elapsed time, speed and heading.

The radar sensors then continually reading mobile robot position based upon feedback from the microcontroller calculations, allowing for estimation of the position of the mobile robot from the combination of heading information, time information, speed information and readings from radar system indicating the location of the mobile robot, wherein the readings are taken at different times.

The system further having a camera or cameras external to the mobile robot wherein the camera can validate the results of the radar sensors to verify the distance from the cameras to the mobile robot.

Using a known location of the cameras or cameras relative to the radar system sensor or sensors in order to calculate a correction of the location of the mobile robot.

Additionally adding an Ultra Wide Band RFID tag to the mobile robot which can be read by the same radar signal sensor to identify the mobile robot and triangulate or trilateralize its position.

Further adding a RFID tag placed in a known location in the yard and a RFID reader for reading this tag in order for the system to allow self-calibration of the distance measurement from the robot to the tag.

Additionally the tag could be a metal spike or plate and a magnetic sensor contained within the mobile robot for locating the metal plate.

Additionally the calibration tag could be a chemical tag and the mobile robot could contain a unique chemical sensor wherein the mobile robot can determine its proximity to the chemical tag.

Additionally, the sensor data could be filtered using techniques, including Kalman filters, particle filters, Bayesian filters and other well-known filtering techniques In accordance with one embodiment, a system for determining the location of a mobile robot relative to two distance sensing elements with a known location and separation includes one or more of the following elements.

At least one mobile robot.
A programmable microcontroller system.
A wireless communication system.
At least one distance measurement sensor.
At least one camera external to the mobile robot.
At least one variable reflectance base station at a known location.
Optionally a known fixed reference object identified during the system setup.
At least one charging station.
A wireless user interface control.

The microcontroller system being programmed to employ the distance measuring sensor to measure the distance to a variable reflectance base station.

The microcontroller system being programmed to record images from the camera system.

The microcontroller system being programmed to control the reflectance of a variable reflectance base station.

The microcontroller being programmed to command the camera to turn to an orientation and position capable of allowing the variable reflector to be identified.

The microcontroller system being programmed to receive into a memory system a map of a work area.

The microcontroller being programmed to vary the scan angle of the camera to locate the variable reflector while continuously varying the reflector system in order to locate the reflectors.

Once the reflector is identified, the microcontroller being programmed to measure the distance from the robot to the variable reflector.

The microcontroller being programmed with the location or angle of the at least one reflector or reflectors and the optional known fixed object.

The microcontroller being programmed to calculate the location of the mobile robot based upon the distances and angles of the robot to the fixed location and at least one variable reflector.

The microcontroller being programmed to identify the robot location on a map stored in a memory device based upon the location of the robot and the location.

The microcontroller being programmed to plan a path to a next location based upon the comparison of the map location, past map locations and desired work area.

The microcontroller being programmed to operate a work element such as a grass cutting system only in areas identified on the stored map as work areas based upon the estimated position of the mobile robot as calculated by the microcontroller system.

The microcontroller system being programmed to return the mobile robot to a known location for service or re-energizing based upon a schedule, battery voltage, current storage level or blade sharpness criteria as identified by the robot sensor systems.

The microcontroller system being programmed to store work areas completed and work areas not completed based upon location and operation of the mobile robot and the location information derived from the variable reflectors and the distance sensors.

The microcontrollers system being programmed to return the mobile robot to the work area in a sub-set of areas of uncompleted work in order to complete all of the tasks in the programmed work area.

The microcontroller system being programmed to return to the fixed base station or programmed end location on the system map after a second map recording the areas of completed work is equal to the programmed map of the required work area.

One aspect of the disclosed technology relates to an autonomous mobile work system for performing work in a user selected area, comprising: a mobile work system comprised of a sensor configured to locate a variable reflectivity base station and measure the distance to said base station; and at least one variable reflectivity base station.

In accordance with one feature, the autonomous mobile work system includes at least one charging base station.

In accordance with one feature, at least one of said base stations is a charging base station.

One aspect of the disclosed technology relates to a unified work apparatus comprising: an autonomous mobile work system comprised of a sensor configured to locate a variable reflectivity base station and measure the distance to said base station; and at least one variable reflectivity base station.

In accordance with one feature, the unified work apparatus includes at least one charging base station.

Another aspect of the disclosed technology relates to a method of determining the location of an autonomous mobile work device. The method includes providing a first and second variable reflectivity base station and an autonomous mobile work device, wherein said autonomous mobile work device is configured to determine the distance between said base station and said autonomous mobile work system; providing the location and orientation of a first variable reflective base station to said autonomous mobile work device; providing the location and orientation of a second variable reflective base station to said autonomous mobile work system; changing the reflectivity state of said first base station; calculating the distance between said first base station and said autonomous mobile work system; changing the reflectivity state of said second base station; calculating the distance between said second base station and said autonomous mobile work device; and calculating the location of said autonomous mobile work device using the calculated distances between said autonomous mobile work device and said first and second base stations.

Another aspect of the disclosed technology relates to a method of determining the location of an autonomous mobile work device comprising: providing a first and second variable reflectivity base station and an autonomous mobile work device, wherein said autonomous mobile work device is configured to calculate the distance between said base station and said autonomous mobile work device; obtaining the distance between said autonomous mobile work device and each of the first and second base stations; and calculating the location of said autonomous mobile work device using the calculated distances between said autonomous mobile work system and said first and second base stations.

Another aspect of the disclosed technology relates to a method of determining the location of an autonomous mobile work device comprising: calculating the location of said autonomous mobile work device using a calculated distance between the autonomous mobile work device and a first variable reflectivity base station and a calculated distance between said autonomous mobile work device and a second variable reflectivity base station.

Another aspect of the disclosed technology relates to a method of determining the location of an autonomous mobile robot device comprising: using reflectivity to calculate the location of said autonomous mobile robot device.

The figures illustrate exemplary aspects of the disclosed technology described above in more detail.

FIG. 1 is a flow chart representing aspects of an exemplary method for determining the distance between the variable reflectors and the mobile work system in accordance with one exemplary embodiment. As is described more fully above, one or more of the illustrated steps can be omitted within the scope of the disclosed technology.

Figure 2:
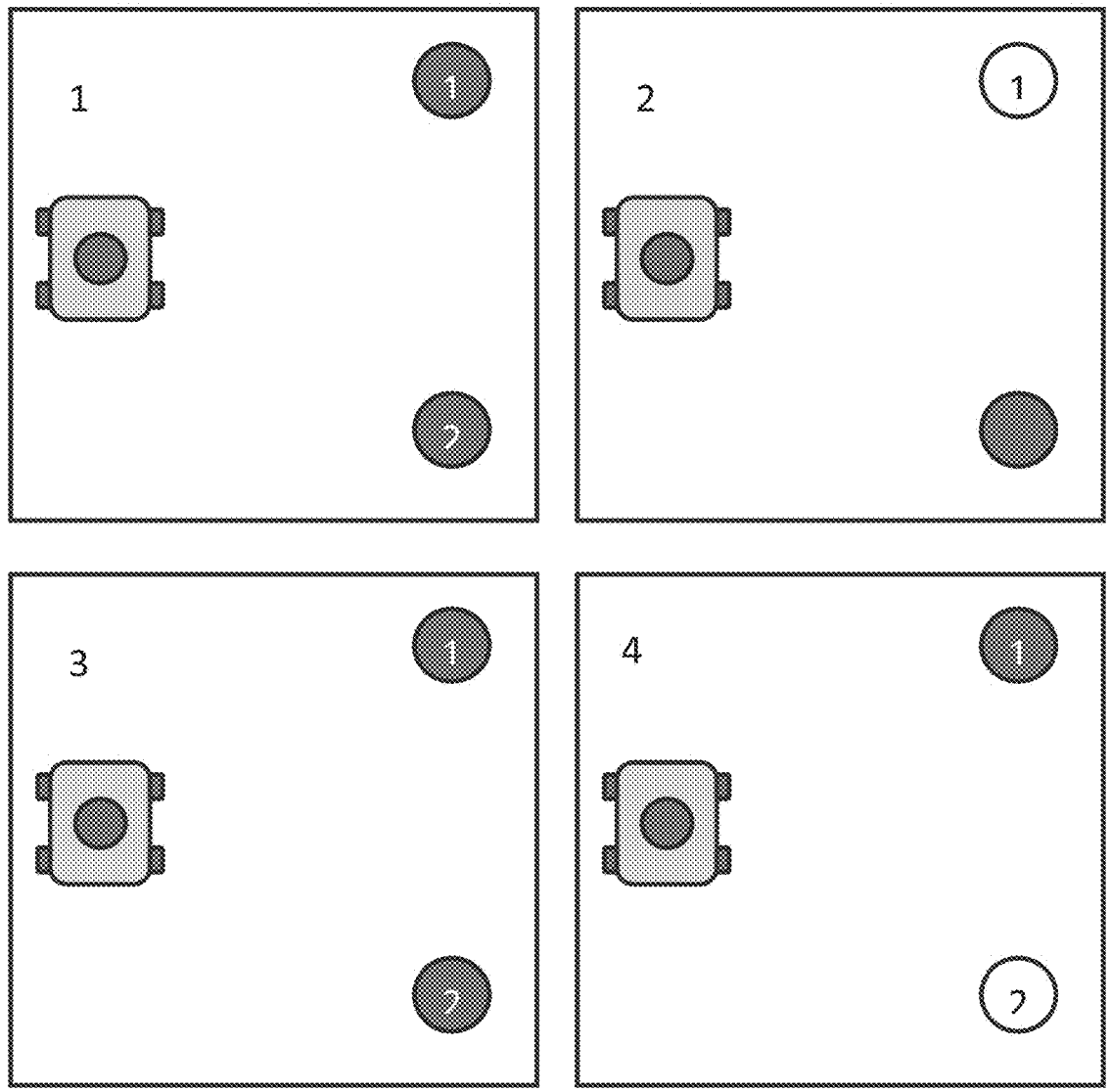
FIG. 2 and FIG. 3 are diagrammatic representations of the system in a first state with equal reflection, a second state where the reflection of one reflector has changed between a first and a second state, a third state where the first reflector has returned to its original state and a fourth state where a second reflector has changed to a different reflective state.
Figure 3:
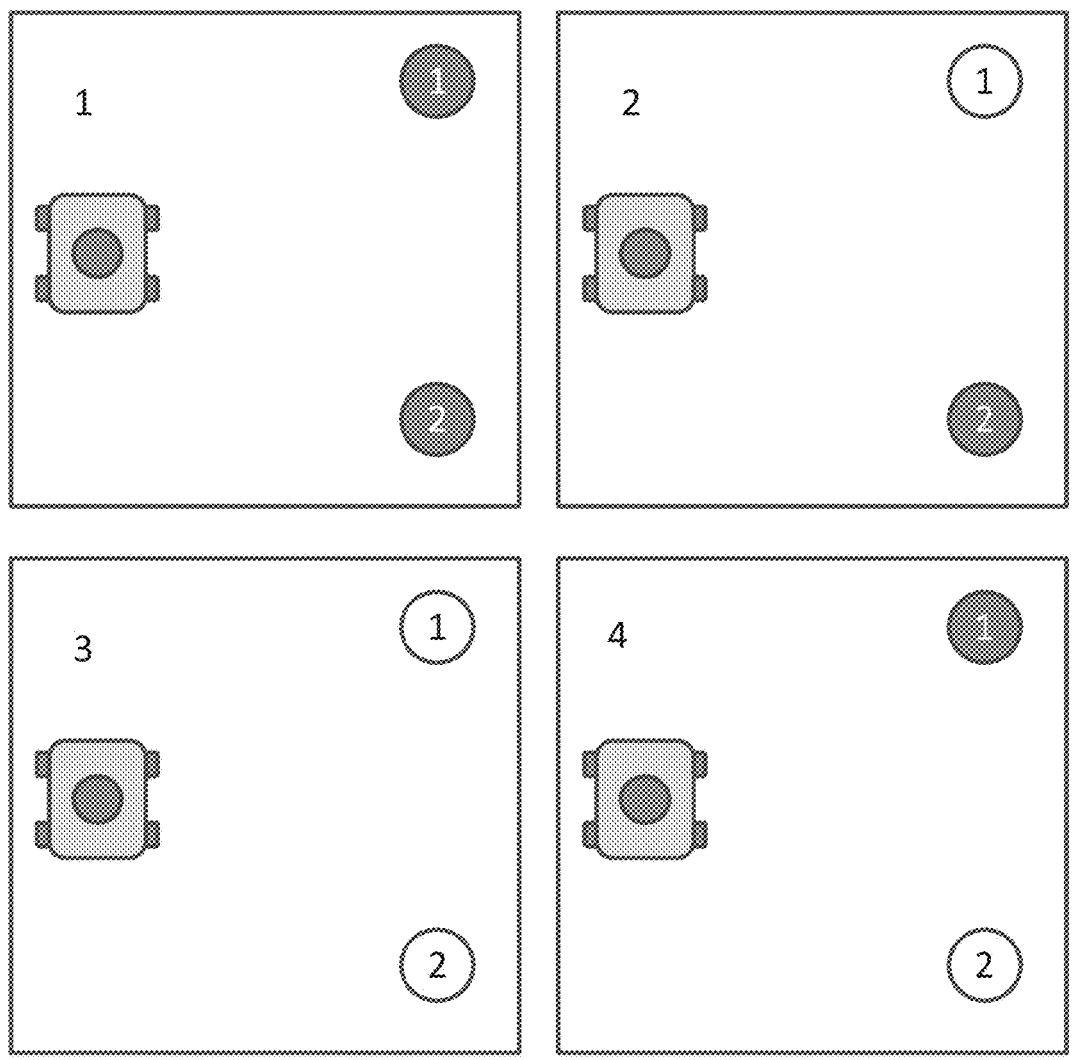

FIG. 2 and FIG. 3 are diagrammatic representations of the system in a first state with equal reflection, a second state where the reflection of one reflector has changed between a first and a second state, a third state where the first reflector has returned to its original state and a fourth state where a second reflector has changed to a different reflective state.

Figure 4:
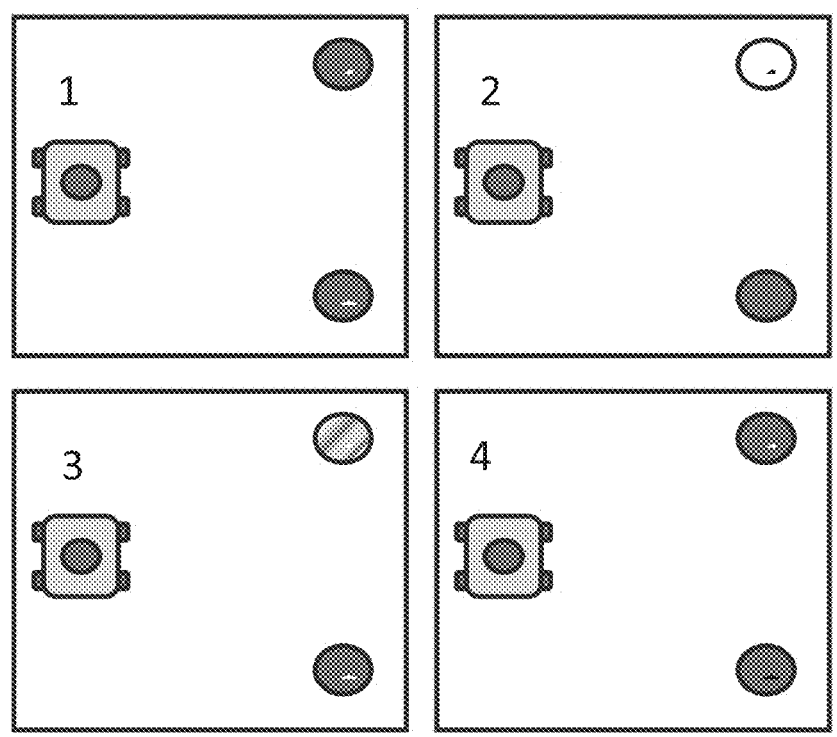
FIG. 4 is a diagrammatic illustration of an exemplary system with multiple reflective states for each variable reflector.

FIG. 4 is a diagrammatic illustration of an exemplary system with multiple reflective states for each variable reflector.

Figure 5:
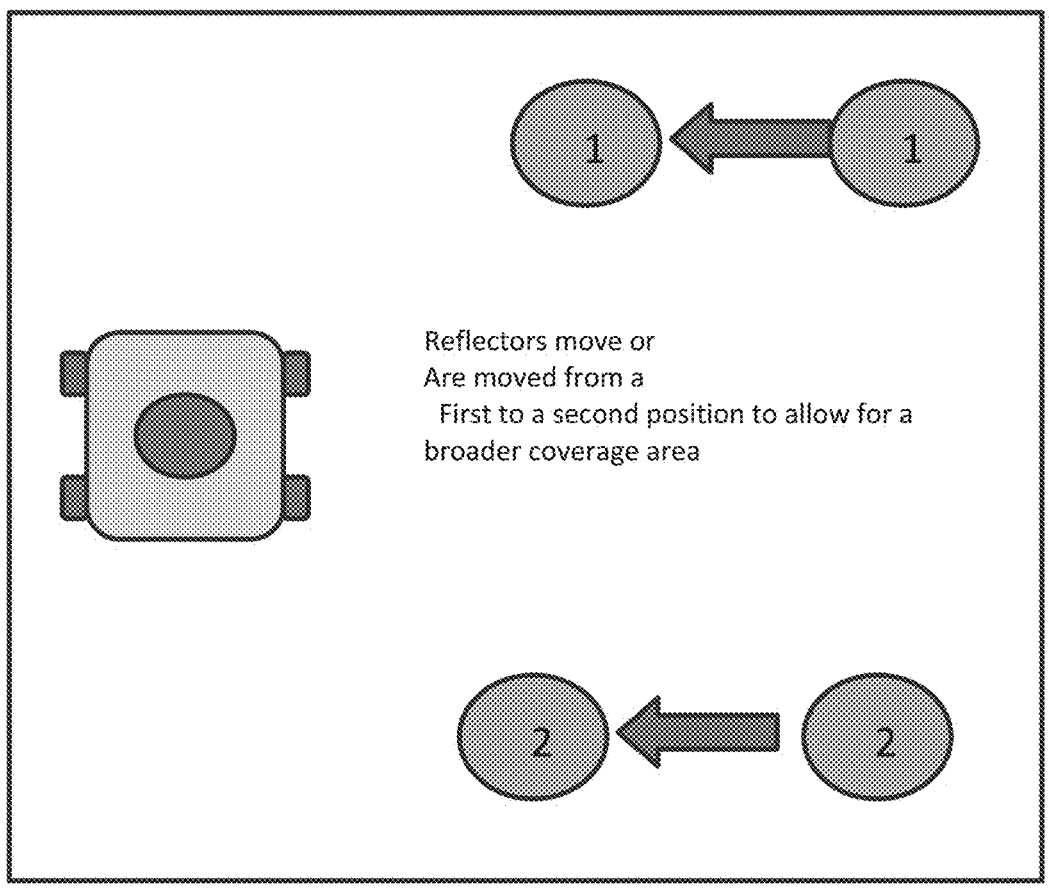
FIG. 5 is a diagrammatic illustration showing that variable reflectors may be moved by the user or by the mobile work system to allow for large coverage areas in accordance with one exemplary embodiment.

FIG. 5 is a diagrammatic illustration showing that variable reflectors may be moved by the user or by the mobile work system to allow for large coverage areas in accordance with one exemplary embodiment.

Figure 6:
FIG. 6 is a diagrammatic illustration showing swarms of autonomous mobile work devices, each with variable reflectors and reflection sensors with optional non autonomous variable reflectors in accordance with one exemplary embodiment.
Figure 6:
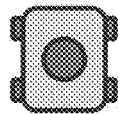
Figure 6:

FIG. 6 is a diagrammatic illustration showing swarms of autonomous mobile work devices, each with variable reflectors and reflection sensors with optional non autonomous variable reflectors in accordance with one exemplary embodiment.

Figure 7:
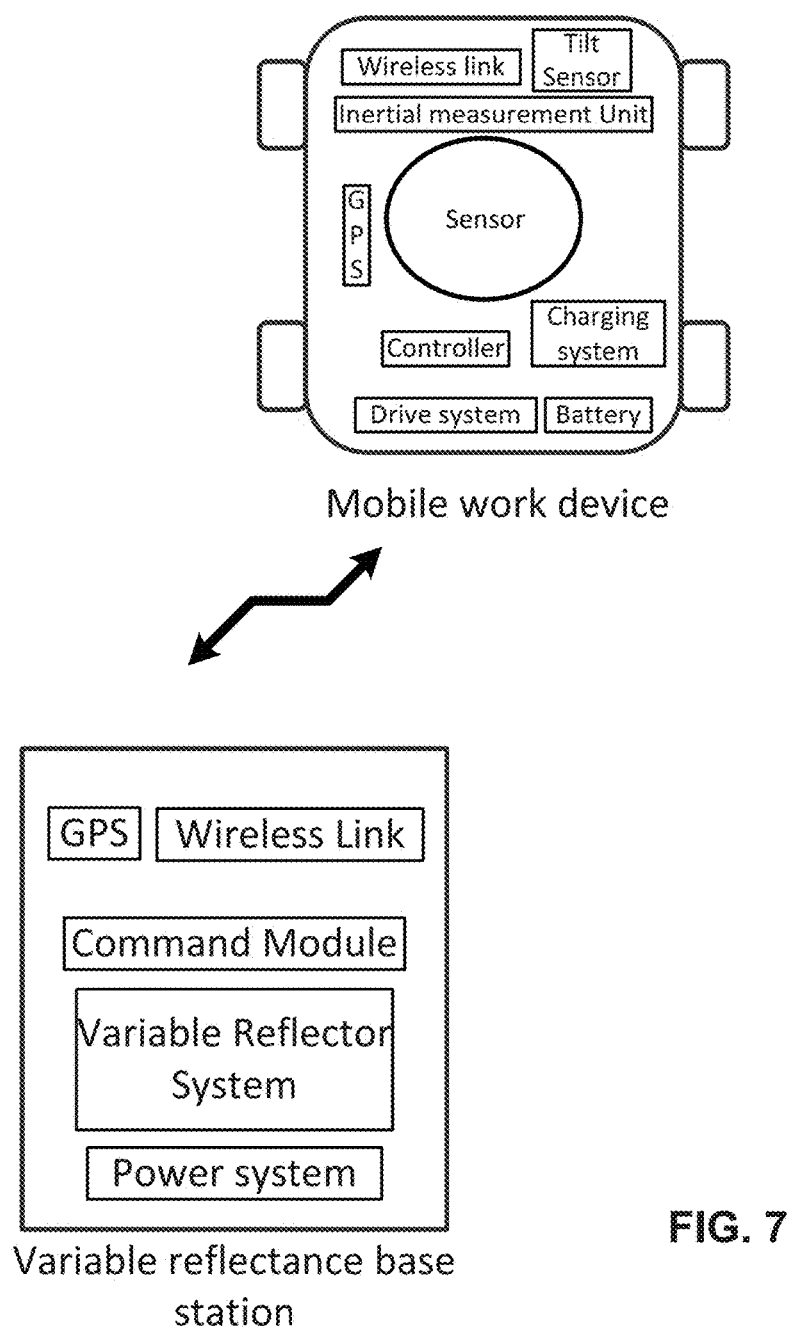
FIG. 7 is a diagrammatic illustration of an exemplary mobile work device and an exemplary variable reflector base station in accordance with one exemplary embodiment.
Figure 8:
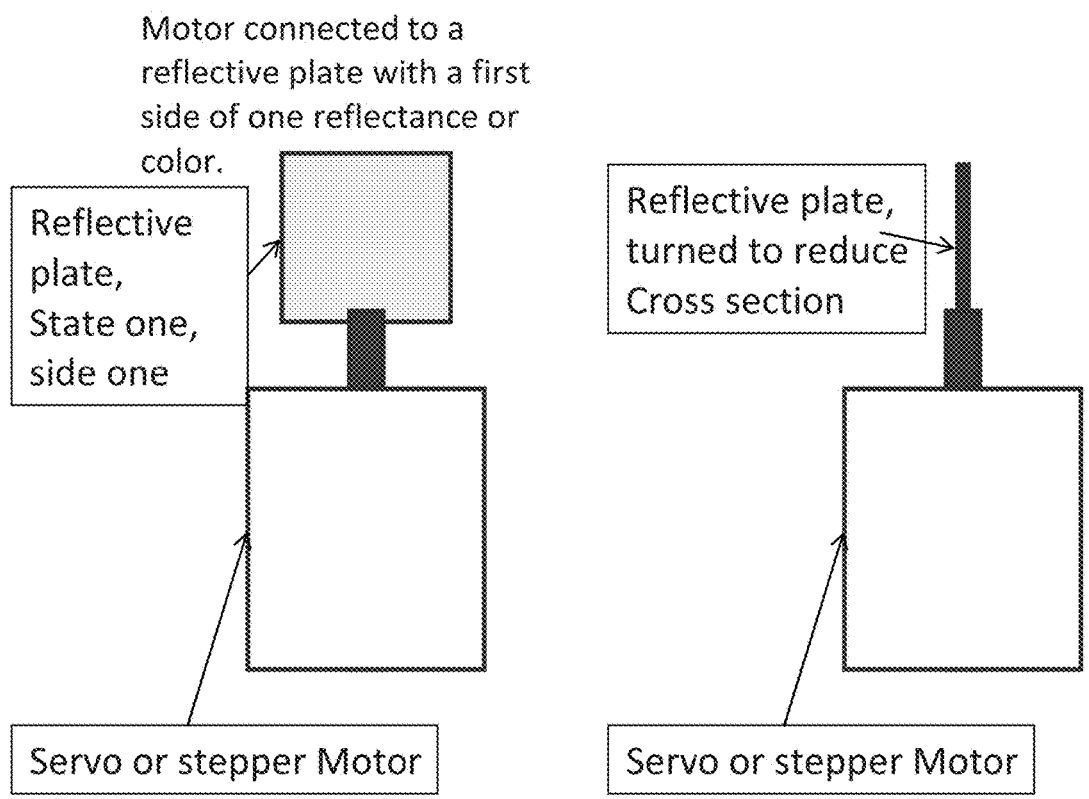
FIG. 8 is a diagrammatic illustration showing one system for creating a variable radar reflector in accordance with one exemplary embodiment.

FIG. 7 is a diagrammatic illustration of an exemplary mobile work device and an exemplary variable reflector base station in accordance with one exemplary embodiment;

FIG. 8 is a diagrammatic illustration showing one system for creating a variable radar reflector in accordance with one exemplary embodiment.

Figure 9:
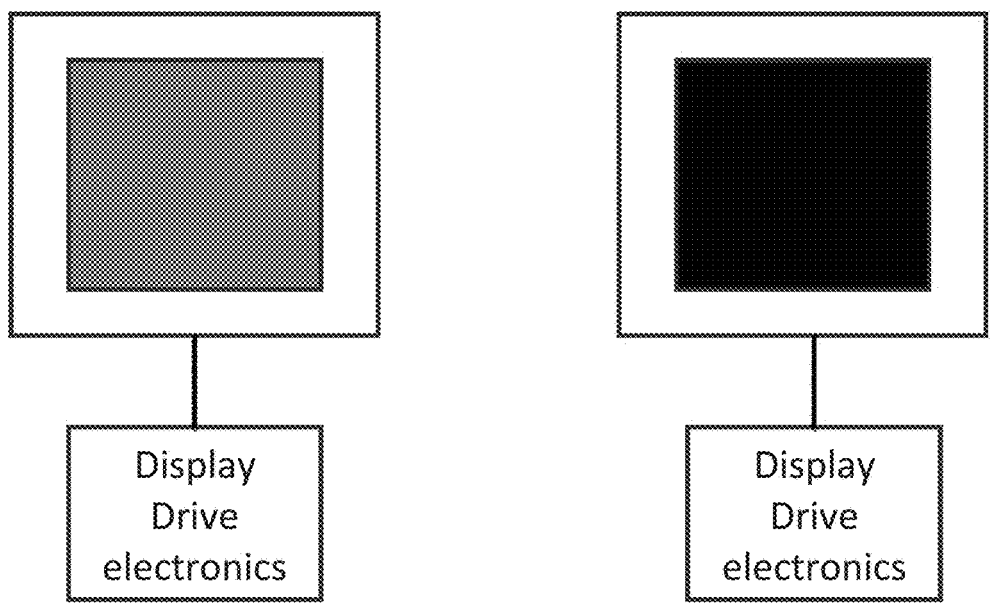
FIG. 9 is a diagrammatic illustration showing an optical variable reflector based upon bi-stable display technology such as bi-stable cholesteric LCD technology in accordance with one exemplary embodiment.

FIG. 9 is a diagrammatic illustration showing an optical variable reflector based upon bi-stable display technology such as bi-stable cholesteric LCD technology in accordance with one exemplary embodiment.

Figure 10:
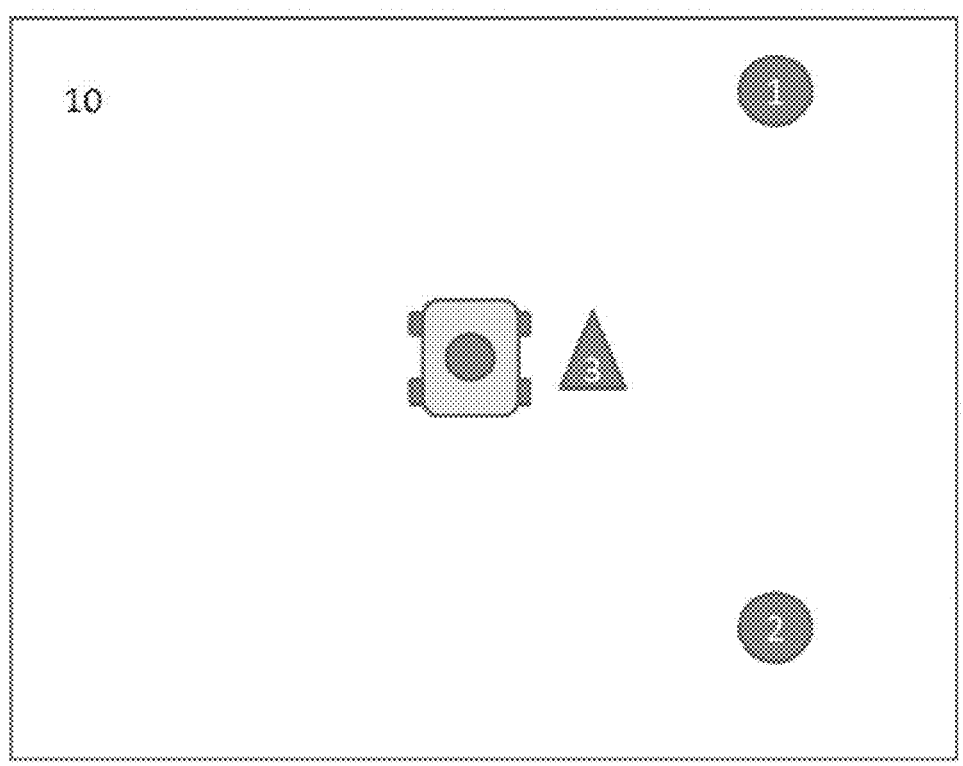
FIG. 10 is a diagrammatic illustration showing calibration of the mobile robot location using a known location tag and onboard tag sensor with a combination of cameras, radar systems or both in accordance with one exemplary embodiment.

FIG. 10 is a diagrammatic illustration showing calibration of the mobile robot location using a known location tag and onboard tag sensor with a combination of cameras, radar systems or both in accordance with one exemplary embodiment.

Although the disclosed technology has been shown and described with respect to a certain preferred aspect, embodiment or embodiments, it is obvious that equivalent alterations and modifications will occur to others skilled in the art upon the reading and understanding of this specification and the annexed drawings. In particular regard to the various functions performed by the above described elements (components, assemblies, devices, members, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary aspect, embodiment or embodiments of the disclosed technology. In addition, while a particular feature of the disclosed technology may have been described above with respect to only one or more of several illustrated aspects or embodiments, such feature may be combined with one or more other features of the other embodiments, as may be desired and advantageous for any given or particular application.

What is claimed is:

1. A method of determining a location of an autonomous mobile work device, the method comprising:
   providing a first variable reflectivity base station, and a second variable reflectivity base station;
   transmitting a first command from the autonomous mobile work device to the first variable reflectivity base station that changes an optical and/or an electromagnetic reflectivity state of the first variable reflectivity base station;
   determining a first reflectivity measurement;
   transmitting a second command from the autonomous mobile work device to the second variable reflectivity base station that changes the optical and/or electromagnetic reflectivity state of the second variable reflectivity base station;
   determining a second reflectivity measurement;
   identifying the first variable reflectivity base station and the second variable base station based on the first reflectivity measurement and the second reflectivity measurement;
   providing a location of the first variable reflectivity base station and a location of the second variable reflectivity base station to the autonomous mobile work device;
   changing a reflectivity state of the first variable reflectivity base station;
   calculating a first distance between the first variable reflectivity base station and the autonomous mobile work device, wherein the first distance is calculated by the autonomous mobile work device;
   changing the reflectivity state of the second variable reflectivity base station;
   calculating a second distance between the second variable reflectivity base station and the autonomous mobile work device, wherein the second distance is calculated by the autonomous mobile work device; and
   calculating the location of the autonomous mobile work device based on the first and second calculated distances, wherein the location is calculated by the autonomous mobile work device.

2. The method of determining the location of an autonomous mobile work device of claim 1, wherein changing the reflectivity state of the first and second variable reflectivity base stations comprises changing an electromagnetic reflectivity state of the first and second variable reflectivity base stations.

3. The method of determining the location of an autonomous mobile work device of claim 1, comprising
   providing an orientation of the first variable reflectivity base station and an orientation of the second variable reflectivity base station to the autonomous mobile work device;
   changing the reflectivity state of the first variable reflectivity base station;
   calculating an angle between the first variable reflectivity base station and the autonomous mobile work system;
   changing the reflectivity state of the second variable reflectivity base station;

calculating a second angle between the second variable reflectivity base station and the autonomous mobile work system; and calculating the location of the autonomous mobile work system based at least in part on the first and second calculated angles.

4. The method of determining the location of an autonomous mobile work device of claim 1, comprising: calculating the location of the autonomous mobile work system based on the provided location of the first variable reflectivity base station and the provided location of the second variable reflectivity base station.

5. The method of determining the location of an autonomous mobile work device of claim 1, wherein changing the reflectivity state of the first variable reflectivity base station and changing the reflectivity state of the second variable reflectivity base station comprises changing an optical and/or an electromagnetic reflectivity state.

6. The method of determining the location of an autonomous mobile work device of claim 1, wherein changing the reflectivity state of the first variable reflectivity base station comprises changing an electromagnetic reflectivity state.

7. The method of determining the location of an autonomous mobile work device of claim 1, wherein changing the reflectivity state of the first variable reflectivity base station comprises changing an optical reflectivity state.

8. The method of determining the location of an autonomous mobile work device of claim 1, wherein changing the reflectivity state of the second variable reflectivity base station comprises changing an electromagnetic reflectivity state.

9. The method of determining the location of an autonomous mobile work device of claim 1, wherein changing the reflectivity state of the second variable reflectivity base station comprises changing an optical reflectivity state.

10. The method of determining the location of an autonomous mobile work device of claim 1, wherein changing the reflectivity state of the first variable reflectivity base station occurs in response to an external command.

11. The method of determining the location of an autonomous mobile work device of claim 1, wherein changing the reflectivity state of the first variable reflectivity base station occurs in response to a predetermined schedule.

12. The method of determining the location of an autonomous mobile work device of claim 1, wherein changing the reflectivity state of the second variable reflectivity base station occurs in response to an external command.

13. The method of determining the location of an autonomous mobile work device of claim 1, wherein changing the reflectivity state of the second variable reflectivity base station occurs in response to a predetermined schedule.

* * * * *